C. HAYTHORPE.
MECHANICAL METHOD OF TREATMENT OF FEED WATER TO BOILERS FOR PREVENTION OF INCRUSTATION, CORROSION, OR PITTING.
APPLICATION FILED NOV. 25, 1911.

1,022,365. Patented Apr. 2, 1912.

Witnesses:

Inventor:
Charles Haythorpe.
By Spear, Middleton, Donaldson & Spear
Attorneys.

UNITED STATES PATENT OFFICE.

CHARLES HAYTHORPE, OF KENNINGTON, LONDON, ENGLAND.

MECHANICAL METHOD OF TREATMENT OF FEED-WATER TO BOILERS FOR PREVENTION OF INCRUSTATION, CORROSION, OR PITTING.

1,022,365. Specification of Letters Patent. Patented Apr. 2, 1912.

Application filed November 25, 1911. Serial No. 662,434.

*To all whom it may concern:*

Be it known that I, CHARLES HAYTHORPE, subject of George V, King of Great Britain and Ireland, and residing at 7 Bowling Green street, Kennington, London, England, have invented certain new and useful Improvements in a Mechanical Method of Treatment of Feed-Water to Boilers for Prevention of Incrustation, Corrosion, or Pitting, of which the following is a specification.

This invention relates to a system for purifying boiler feed water and prevention of corrosion or incrustation on the boiler plates and tubes.

According to my invention, the hot feed water is alternately passed through perforated metal plates and gas coke or other mineral carbon, the said carbon being in electrical connection with the plates.

An apparatus constructed in accordance with this invention is shown in the accompanying drawings in which—

Figure 1:
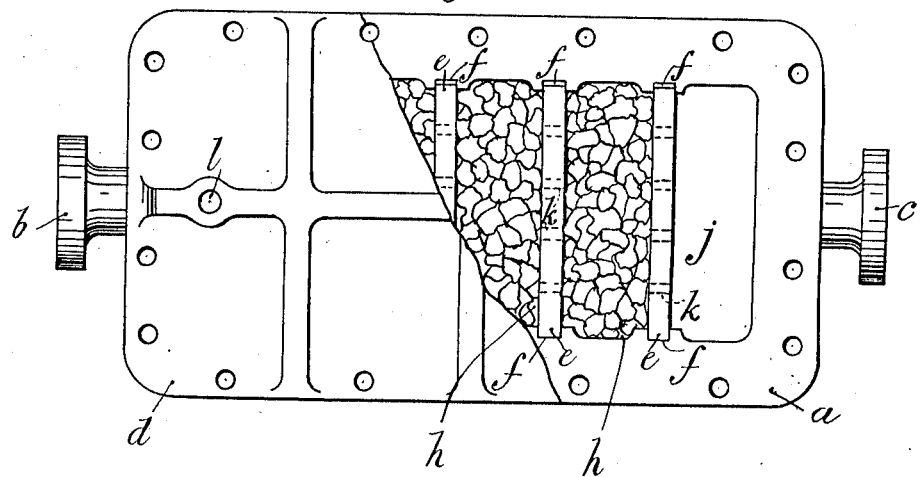
Figure 2:
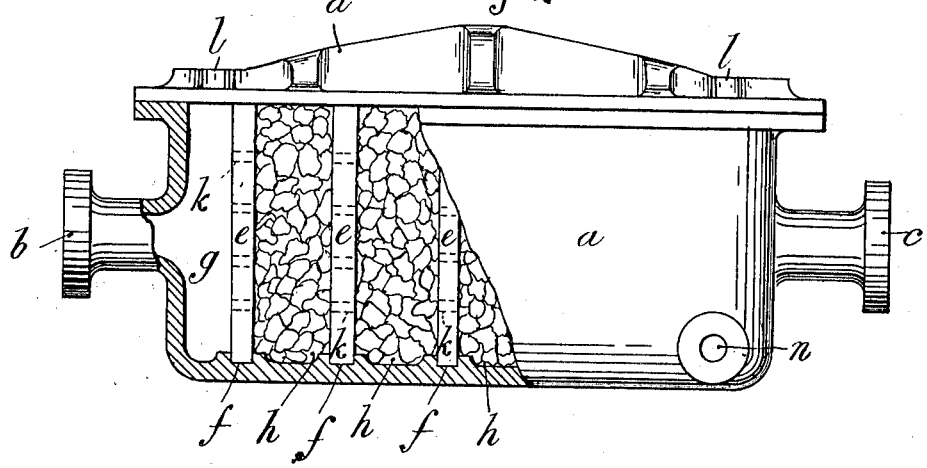

Figure 1 shows a plan partly in section and Fig. 2 a side elevation also partly in section.

Like letters of reference denote similar parts in both figures.

$a$ is a rectangular box or case of metal through which the feed water flows on its way to the boiler.

$b$ is the inlet pipe from the feed-pump and $c$ the outlet to the boiler. A cover $d$ is bolted down on the top so as to make the case tight. A number of plates $e$, $e$, are let into grooves $f$, $f$, formed in the sides and bottom of the case, thereby dividing the latter into separate chambers or compartments $g$, $h$ and $j$. The plates $e$, $e$, are perforated with a number of holes or slots $k$, $k$, and preferably made of cast zinc, though in some cases I may use an alloy of zinc and aluminium or other suitable alloy, or I may make some of the plates of zinc and some of another metal or alloy. The spaces $h$, $h$, between the zinc plates are filled with crushed carbon which may either be gas coke, retort carbon or any other convenient form of the substance.

$l, l,$ are openings for the reception of air-valves, and a blow-off cock is fitted to the opening $n$.

The action of the apparatus is as follows:—Water from the hot-well is delivered by the feed-pump through the pipe $b$ to the distributing chamber $g$. From here it passes through the perforations $k$, $k$, in succession through each of the plates $e$, $e$, and the carbon filled compartments $h$, $h$. Here two actions take place, the carbon and the zinc, acting as a galvanic couple, take up any sulfates in the feed-water, and at the same time cause any grease or fat to separate out. The carbon also acts as a mechanical filter and takes up any suspended impurities and gases that may be present in the feed. Any impurities that may pass through the filter will deposit in the settling chamber $j$ and may be drawn off from time to time through the said blow-off cock fixed at $n$. These deposits will be in the form of a fine mud, as the action of the zinc in removing the sulfate renders all deposits non-adhesive and consequently non-scaling.

I fix this apparatus in the line of the feed-pipe, this position being convenient as it is of course necessary to replace the carbon and zinc plates from time to time as they respectively get clogged up by impurities and worn out by the galvanic action set up.

I claim:—

An apparatus for treatment of feed water for steam boilers, consisting of a casing having an inlet and an outlet, zinc plates disposed vertically in said casing and forming chambers therebetween, the end zinc plates being spaced from the end walls of the casing to form distributing and sediment chambers communicating with the inlet and outlet respectively, crushed carbon interposed between the intermediate zinc plates, said carbon acting both as a filter and as one element of an electric couple of which the zinc forms the other element, the water passing through the casing forming the electrolyte, substantially as described.

In witness whereof I have hereunto set my hand in the presence of two witnesses.

CHARLES HAYTHORPE.

Witnesses:
GRAYDON PORRE,
C. J. CHARLTON.

Copies of this patent may be obtained for five cents each, by addressing the "Commissioner of Patents, Washington, D. C."